Nov. 5, 1968     E. T. CLINTON     3,409,105

CASTER ASSEMBLY

Filed June 21, 1967

INVENTOR
EDWIN T. CLINTON

By Norton Lesser
Attorney

United States Patent Office 3,409,105
Patented Nov. 5, 1968

3,409,105
CASTER ASSEMBLY
Edwin T. Clinton, Redding Ridge, Conn., assignor to Stewart-Warner Corporation, Chicago, Ill., a corporation of Virginia
Filed June 21, 1967, Ser. No. 647,707
10 Claims. (Cl. 188—29)

ABSTRACT OF THE DISCLOSURE

A caster assembly having a caster wheel rotatably mounted on a horizontal axis in a horn rotatably mounted on a vertical swivel axis to an attaching unit, and a vertical rod member in the attaching unit selectively actuatable from a remote location to effect engagement of a swivel locking lever on the horn with the attaching unit and to effect engagement of a brake lever on the horn with the caster wheel.

BACKGROUND OF THE INVENTION

Field of the invention

The present invention pertains generally to caster assemblies such as those used on stretcher carriers or the like in hospitals.

Description of the prior art

A stretcher carrier or the like is usually provided with a plurality of caster assemblies at the leg portions thereof. Each caster assembly basically comprises a horn with a crown and side leg portions in which a caster wheel is mounted upon an axle, a vertical attaching unit secured in the leg portion, and bearing means mounting the horn crown to the attaching unit for swivel movement about a vertical axis. In positioning or maneuvering a stretcher carrier provided with caster assemblies it is frequently desirable to lock one or more of the horns against swivel movement and to brake the associated swivel wheels. Various forms of swivel locking and wheel braking devices have been proposed by the prior art, all of which have one or more of the following disadvantages. Certain prior art devices permit either swivel locking or wheel braking, but not both; other devices accommodate swivel locking and wheel braking simultaneously, but not alternatively; and most of the devices are foot-operated and hence inconvenient to use. In addition, known devices are expensive to manufacture and are inefficient in operation.

Summary of the invention

In accordance with the present invention, a vertical rod member is slidably mounted in the attaching unit, a brake lever is pivotally mounted on the horn and has a wheel engageable brake portion, a swivel locking lever is pivotally mounted on the horn and is engageable with the attaching unit, spring means are arranged to normally bias the brake lever away from engagement with the caster wheel and to a position maintaining the swivel locking lever out of engagement with the attaching unit, and an operating lever is pivotally mounted on the attaching unit and engages the upper end of the rod member.

The operating lever is adapted to be pivoted to a first operating position to depress the rod member against the force of the spring means for moving the brake lever to an intermediate position to permit engagement of the swivel locking lever with the attaching unit whereby to lock the horn against swivel movement. The operating lever is also adapted to be pivoted to a second operating position to further depress the rod member against the force of the spring means to effect engagement of the wheel engageable brake portion with the wheel whereby to brake the latter.

In addition, control means is adapted to be mounted at a location remote from the operating lever, force transmitting means interconnects the control means and the operating lever, and the control means is manually operable to effect pivoting of the operating lever.

By reason of the foregoing arrangement, the horn may be locked against swivel movement either along or in conjunction with braking of the caster wheel, and swivel locking and wheel braking can be conveniently controlled at a location remote from the caster assembly. More particularly, caster assemblies of the present invention may be provided at the diagonally opposed corners of a stretcher carrier, and operated by a single master manual control located at the head-end of the carrier. As will appear from the more detailed description hereinafter, the caster assembly and control means therefor are efficient in operation and inexpensive to manufacture.

Description of the preferred embodiment

Figures 1, 2, 3:
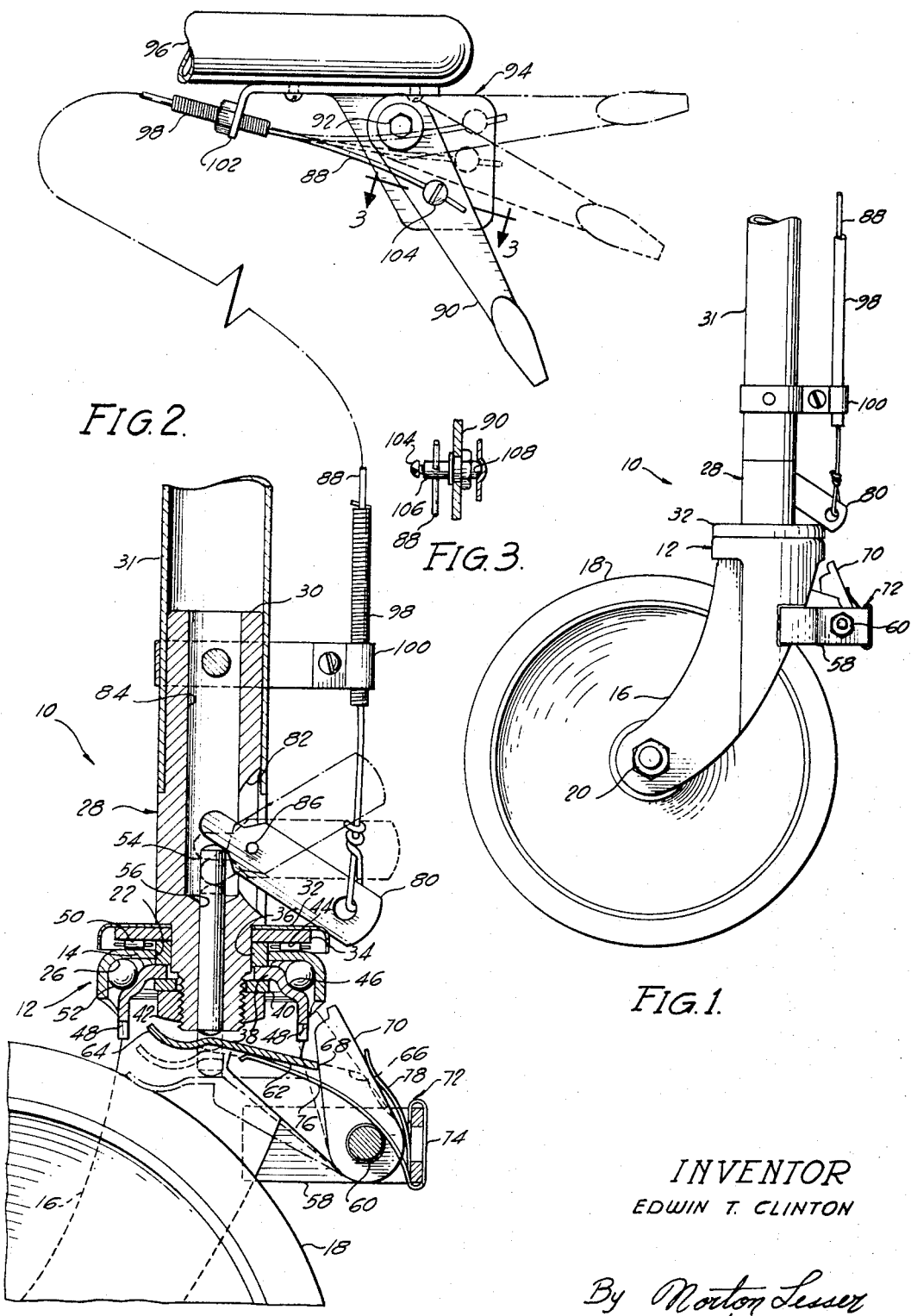
FIGURE 1 is a side elevational view of a caster assembly incorporating the principles of the present invention.
FIGURE 2 is a median sectional view, on an enlarged scale, of the caster assembly of FIGURE 1 and the manual control means therefor.
FIGURE 3 is a fragmentary sectional view, taken substantially along the line 3—3 in FIGURE 2, looking in the direction indicated by the arrows.

Referring now to FIGURES 1 and 2, there is shown a caster assembly 10 which includes a horn 12 comprised of a crown 14 and depending side leg portions 16. A caster wheel 18 is rotatably mounted on a horizontal axle 20 which is secured in the lower ends of the side leg portions 16, and which is offset laterally from the vertical swivel axis of the horn 12. The crown 14 is formed with a central opening 22, and presents an upper annular bearing race 24 at its upper side and a lower annular bearing race 26 at its under side.

The horn 12 is rotatably mounted to an attaching unit 28 for swivel movement about a vertical axis. The attaching unit 28 comprises a vertical tubular attaching stem 30, the upper end of which is adapted to be secured in the tubular leg portion 31 of an appliance such as a stretcher carrier, and the lower end of which extends downwardly through the central opening 22 in the crown 14. Located on the lower portion of the attaching stem 30 are a dust cover 32, an upper race washer member 34, a spacer washer 36, and a lower inverted cup member 38. These members are secured against a shoulder on the attaching stem 30 by means of a washer 40 and a nut 42 threaded onto the lower end of the attaching stem 30. If desired, the lower portion of the attaching stem 30 may be provided with flats to prevent relative rotation of the members secured thereon.

The upper race washer member 34 presents an annular bearing race 44 at its underside, the lower inverted cup member 38 presents an annular bearing race 46 at its upper side and one or more peripheral locking notches 48. Bearing means rotatably mounting the horn 12 to the attaching unit 28 comprises rolling needle bearing elements 50 engaged between the upper bearing race 24 of the crown 14 and the bearing race 44 of the upper race washer member 34, and further comprises rolling ball bearing elements 52 engaged between the lower bearing race 26 of the crown 14 and the bearing race 46 of the cup member 38.

Means for selectively locking the horn 12 against swivel movement and braking the caster wheel 18 will now be described. Such means comprises a vertical rod member 54 which is slidably mounted in a bore 56 provided in the lower section of the attaching stem 30. Secured to the side leg portions 16 of the horn 12 below the rod member 54 is a generally C-shaped bracket member 58 which supports a horizontal transverse shaft 60. The shaft 60 is parallel to the wheel axle 20 and is laterally offset from the vertical swivel axis of the horn 12 on the opposite side thereof as the wheel axle 20. An actuating lever 62, at one end, is pivotally mounted on the shaft 60, and, at its other end, is provided with a wheel engageable brake portion 64. The actuating or brake lever 62 includes a slot 66 that presents a shoulder 68. A swivel locking lever 70, at one end, is also pivotally mounted on the shaft 60, and, at its other end, is engageable with the locking notch 48 of the cup member 38. The swivel locking lever 70 is received in and projects upwardly through the brake lever 66 and is adapted to be engaged by the brake lever shoulder 68.

Associated with the brake lever 62 and the swivel locking lever 70 is spring means in the form of a leaf spring unit including a base portion 74 secured to the bight portion of the bracket member 58, outer leaf spring arcs 76 that engage the underside of the brake lever 62, and a central leaf spring arm 78 that engages the outboard side of the swivel locking lever 70. The leaf spring arms 76 maintain the brake lever 62 in engagement with the lower end of the rod member 54, and normally bias the brake lever 62 away from engagement with the caster wheel 18 to a position where the shoulder 68 engages and maintains the swivel locking lever 70 out of engagement with the locking notches 48.

An operating lever 80 extends through a slot 82 formed in the side of the attaching stem 30 and projects into an enlarged central bore 84 provided in the upper section of the attaching stem 30. The operating lever 80 is pivotally mounted intermediate of its ends, as at 86, about a horizontal axis located intermediate of the parallel vertical planes of the vertical swivel axis of the horn 12 and the horizontal axis of the shaft 60. One end of the operating lever 80 engages the upper end of the rod member 54 and the other end of the lever 80 has secured thereto the one end of a flexible wire 88. The other end of the flexible wire 88 extends to a manually operable control lever 90 pivotally mounted as at 92 in a housing 94 secured, at a location remote from the operating lever 80, to an upper frame member 96 of the appliance with which the caster assembly 10 is associated. The flexible wire 88, which serves as force transmitting means, is enclosed in a flexible casing 98 which, at one end, is secured in a strap member 100 carried by the tubular leg 31 and, at its other end, is secured in the flange portion 102 of the lever housing 94. As shown in FIGURE 3, the end of the flexible wire 88 adjacent the control lever 90 is secured by means of a set screw 104 in an aperture formed in the outer end of a post member 106 pivotally mounted in the lever 90. The inner end of the post member 106 is engageable with either one of three indentations 108 which are formed in the wall of the lever housing 94 and which serve to releasably locate the control lever in one of three pivotal positions.

When the control lever 90 is disposed in the solid line position shown in FIGURE 2, the various components of the swivel assembly 10 assume the solid line positions shown, and the wheel engageable brake portion 64 and the swivel locking lever 70 are rendered inactive. If swivel locking is desired, the control lever 90 is pivoted to the dash line position which, through the flexible wire 88, causes the operating lever 80 to pivot to the dash line position. The rod member 54 is thereby depressed against the force of the leaf spring arms 76 to effect movement of the brake lever 62 to the intermediate position shown in dash lines. The brake lever shoulder 68 is withdrawn from engagement with the swivel locking lever 70 and the latter, under the bias of the central leaf spring arm 78, is urged against the side of the cup member 38 and ultimately into engagement with one of the locking notches 48 whereby to lock the horn 12 against swivel movement. Finally, pivoting of the control lever 90 to the dot-dash line position effects pivoting of the operating lever 80 to the dot-dash line position. The rod member 54 is thereupon further depressed against the force of the leaf spring arms 76 and moves the brake lever 62 to the dot-dash position to effect engagement of the wheel engagement brake portion 64 with the wheel 18 whereby to brake the latter. To release the wheel brake and swivel lock means, the control lever 90 is returned to the solid line position. The leaf spring arms 76 return the brake lever 62, the rod member 54 and the operating lever 80 to the solid line positions; and the brake lever shoulder 68 again engages and returns the swivel locking lever 70 to the solid line position.

I claim:

1. In a caster assembly, a horn, an attaching unit, bearing means mounting said horn to said attaching unit for swivel movement about a vertical axis, a vertical rod member slidably mounted in said attaching unit, a swivel locking lever pivotally mounted on said horn and being engageable with said attaching unit, spring biased means having engagement with the lower end of said rod member and normally maintaining said swivel locking lever out of engagement with said attaching unit, an operating lever pivotally mounted on said attaching unit and engaging the upper end of said rod member, and said operating lever being adapted to be pivoted to depress said rod member against the force of said spring biased means to effect engagement of said swivel locking lever with said attaching unit whereby to lock said horn against swivel movement.

2. In a caster assembly, a horn with a crown and side leg portions in which a caster wheel is mounted upon an axle, an attaching unit, bearing means mounting said horn to said attaching unit for swivel movement about a vertical axis, a vertical rod member slidably mounted in said attaching unit, a brake lever pivotally mounted on said horn and having a wheel engageable brake portion, spring means maintaining said brake lever in engagement with the lower end of said rod member and normally biasing said wheel engaging brake portion away from engagement with the wheel, an operating lever pivotally mounted on said attaching unit and engaging the upper end of said rod member, and said operating member being adapted to be pivoted to depress said rod member against the force of said spring means to effect engagement of said wheel engageable brake portion with the wheel whereby to brake the latter.

3. In a caster assembly, a horn with a crown and side leg portions in which a caster wheel is mounted upon an axle, an attaching unit, bearing means mounting said horn to said attaching unit for swivel movement about a vertical axis, a vertical rod member slidably mounted in said attaching unit, a swivel locking lever pivotally mounted on said horn and being engageable with said attaching unit, an actuating lever pivotally mounted on said horn, spring means maintaining said actuating lever in engagement with the lower end of said rod member and normally biasing said swivel locking lever toward engagement with said attaching unit while normally biasing said actuating lever to a position maintaining said swivel locking lever out of engagement with said attaching unit, an operating lever pivotally mounted on said attaching unit and engaging the upper end of said rod member, and said operating lever being adapted to be pivoted to a first operating position to depress said rod member against the force of said spring means to effect movement of said actuating lever thereby to permit engagement of said swivel locking lever with said attaching unit whereby to lock said horn against swivel movement.

4. The caster assembly of claim 3 wherein said actuating lever serves as a brake lever and includes a wheel engageable brake portion, said spring means normally biases said wheel engageable brake portion away from engagement with the wheel, and said operating lever is adapted to be pivoted to a second operating position to further depress said rod member against the force of said spring means to effect engagement of said wheel engageable brake portion with the wheel whereby to brake the latter.

5. The caster assembly of claim 4 wherein said crown of said horn has a central opening therein and presents an upper annular bearing race at its upper side and a lower annular bearing race at its under side; wherein said attaching unit comprises a vertical attaching stem the lower end of which extends through said central opening in said crown, an upper member secured to said stem overlying said crown and presenting an annular bearing race at its under side, and a lower inverted cup member secured to said stem underlying said crown and presenting an annular bearing race at its upper side and a peripheral locking notch; wherein said bearing means comprises rolling bearing elements engaged between said upper bearing race of said crown and said bearing race of said upper member, and rolling bearing elements engaged between said lower bearing race of said crown and said bearing race of said cup member; and wherein said swivel locking lever is engageable with said locking notch of said cup member.

6. The caster assembly of claim 4 wherein said swivel locking lever is pivotally mounted about a first horizontal axis laterally offset from the vertical swivel axis of said horn, said brake lever is pivotally mounted about said first horizontal axis, and said operating lever is pivotally mounted about a second horizontal axis located intermediate of the parallel vertical planes of the vertical swivel axis of said horn and said first horizontal axis.

7. The caster assembly of claim 4 wherein said attaching unit is provided with a locking notch, said swivel locking lever is pivotally mounted at one end about a first horizontal axis laterally offset from the vertical swivel axis of said horn with the other end of said swivel locking lever being engageable with said locking notch of said attaching unit, said brake lever is pivotally mounted at one end about said first horizontal axis with the other end of said brake lever providing said wheel engageable brake portion, and said operating lever is pivotally mounted intermediate of its ends about a second horizontal axis located intermediate of the parallel vertical planes of the vertical swivel axis of said horn and said first horizontal axis with one end of said operating lever engaging the upper end of said rod member.

8. The caster assembly of claim 7 including manual control means adapted to be mounted at a location remote from said operating lever, force transmitting means interconnecting said manual control means and the other end of said operating lever, and said manual control means being operable to effect pivoting of said operating lever.

9. The caster assembly of claim 7 wherein said brake lever includes a slot which receives said swivel locking lever and which presents a shoulder, said spring means normally biases said brake lever to a position where said shoulder engages and maintains said swivel locking lever out of engagement with said attaching unit, and said shoulder is disengaged from said swivel locking lever when said operating lever is pivoted to said first or second position.

10. The caster assembly of claim 9 wherein said spring means comprises at least two leaf spring arms secured on said horn, one of said leaf spring arms engages the underside of said brake lever, the other of said leaf spring arms engages the outboard side of said swivel locking lever, and said other leaf spring arm serves to effect engagement of said swivel locking lever with said locking notch of said attaching unit when said shoulder of said brake lever is disengaged from said swivel locking lever.

References Cited
UNITED STATES PATENTS 2,707,794  5/1955  Kramcsak _____ 16—35
3,066,764  12/1962  Clinton _____ 16—35 X MILTON BUCHLER, *Primary Examiner.*

T. BUCKMAN, *Assistant Examiner.*